United States Patent
Beattie et al.

(10) Patent No.: US 9,665,423 B2
(45) Date of Patent: May 30, 2017

(54) END-TO-END ERROR DETECTION AND CORRECTION

(71) Applicant: Freescale Semiconductor, Inc., Austin, TX (US)

(72) Inventors: Derek Beattie, Glasgow (GB); Mark Jordan, Dursley (GB); Ray Marshall, Harpenden (GB); Deboleena Minz Sakalley, Ghaziabad (IN)

(73) Assignee: NXP USA, Inc., Austin, TX (US)

( * ) Notice: Subject to any disclaimer, the term of this patent is extended or adjusted under 35 U.S.C. 154(b) by 64 days.

(21) Appl. No.: 14/739,116

(22) Filed: Jun. 15, 2015

(65) Prior Publication Data
US 2016/0364289 A1    Dec. 15, 2016

(51) Int. Cl.
| | | |
|---|---|---|
| *G11C 29/00* | (2006.01) | |
| *G06F 11/10* | (2006.01) | |
| *G06F 3/06* | (2006.01) | |
| *G06F 12/10* | (2016.01) | |

(52) U.S. Cl.
CPC .......... *G06F 11/1004* (2013.01); *G06F 3/064* (2013.01); *G06F 3/0619* (2013.01); *G06F 3/0673* (2013.01); *G06F 12/10* (2013.01); *G06F 2212/1016* (2013.01); *G06F 2212/65* (2013.01)

(58) Field of Classification Search
CPC .... G06F 11/1004; G06F 3/0619; G06F 3/064; G06F 3/0673; G06F 2212/1016; G06F 2212/65; G06F 12/10
See application file for complete search history.

(56) References Cited

U.S. PATENT DOCUMENTS

| | | | |
|---|---|---|---|
| 8,898,548 B1 | 11/2014 | Mullendore et al. | |
| 2008/0235485 A1* | 9/2008 | Haertel | G06F 11/1044 711/203 |
| 2012/0144263 A1 | 6/2012 | Keays et al. | |
| 2013/0332789 A1* | 12/2013 | Troia | G06F 11/1048 714/752 |

OTHER PUBLICATIONS

Arteris Technical Paper "Arteris FlexNoC Resilience Package IP," downloaded from http://www.arteris.com/flexnoc-resilience-package on Mar. 13, 2015, 2 pages.
Genua, P., "Error Correction and Error Handling on PowerQUIC-C(TM) III Processors," Document No. AN3532, Rev. 0, Nov. 2007, pp. 1-16.
Probell, J. and De Lescure, B., "SoC Reliability Features in the FlexNoC Resilience Package," Arteris Inc. Abstract, 2014, pp. 1-2.
U.S. Appl. No. 14/258,327, filed Apr. 22, 2014, entitled "Apparatus for Error Detection in Memory Devices," naming Ray C. Marshall as first inventor.

* cited by examiner

*Primary Examiner* — Sam Rizk (57) ABSTRACT

A technique for providing end-to-end error detection coding between a requesting module and a memory module have been disclosed. A method includes translating a first logical address of a memory request to a physical address. The method includes translating an error control code and data associated with the memory request between a first format and a second format. The error control code and data having the first format is generated based on the first logical address. The error control code and data having the second format is generated based on a second address. The method includes generating an error indicator based on the error control code, the data, and one of the first logical address and the second address.

15 Claims, 5 Drawing Sheets

| 64 BIT PROCESSOR ECC BOUNDARY 302 | PROCESSOR ECC |
|---|---|
| 0x0000 | 8 |
| 0x0008 | 8 |
| 0x0010 | 8 |
| 0x0018 | 8 |
| 0x0020 | 8 |
| 0x0005 | 8 |
| 0x0030 | 8 |
| 0x0038 | 8 |
| 0x0040 | 8 |
| 0x0048 | 8 |
| 0x0050 | 8 |
| 0x0060 | 8 |
| 0x0068 | 8 |
| 0x0070 | 8 |
| ... | |

END-TO-END ERROR DETECTION AND CORRECTION

BACKGROUND

Field of the Invention

This invention relates to electronic devices and, more particularly, to reliable delivery of data between electronic devices.

Description of the Related Art

In general, increasing memory density and decreasing memory cell voltage increases the likelihood of soft errors, which are random data errors caused by external stimulus (e.g., errors due to electromagnetic interference, alpha particles, or voltage spikes) that do not damage the device. Exemplary applications implement error control (e.g., error detection codes or error correction codes) to reduce the likelihood of soft errors impacting system performance. A typical memory system implements basic error control code techniques at the memory system interface. Those error control techniques are based on the data to be stored in the memory system. However, such error control techniques fail to protect against errors introduced in other portions of path between a memory requesting device and the memory system interface. Accordingly, improved techniques for providing error control are desired.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

The use of the same reference symbols in different drawings indicates similar or identical items.

DETAILED DESCRIPTION

Embodiments of the present invention provide an error control technique decreases the susceptibility of a system to soft errors by providing end-to-end error control coding between a memory requesting device and a memory device. The technique includes translating a logical address of a memory request to a physical address and issuing a memory command including the physical address based on the memory request. The technique includes translating an error control code and data associated with the memory request between a first format and a second format. The error control code and data having the first format is generated based on the logical address and the error control code and data having the second format is generated based on a second address. In addition to detecting soft errors in data communicated with the memory system, the technique also detects errors due to errors in addressing of the memory system (e.g., inoperative interface between a requesting processor and a memory).

Figure 1:
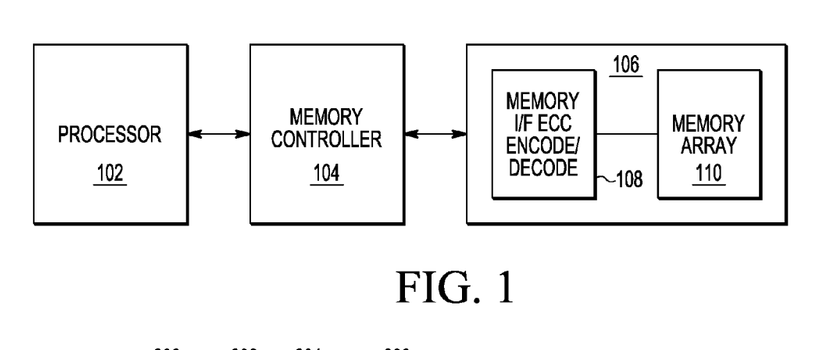
FIG. 1 illustrates a functional block diagram of an exemplary electronics system including error correction coding in a memory device.

Referring to FIG. 1, an conventional system includes processor 102 and memory controller 104 configured to communicate with memory system 106. Memory system 106 includes memory interface 108 and memory array 110 and may be implemented as a stand-alone memory integrated circuit or embedded within other integrated circuits. Memory array 110 is a read/write memory that is readable and writable through read/write commands provided to system 106. Memory array 110 may include flash memory, Magneto-resistive Random-Access Memory (RAM), Ferroelectric RAM (F-RAM), Static RAM (SRAM), Dynamic RAM (DRAM), magnetic computer storage devices, optical discs, or any other suitable memory and in some embodiments, memory array 110 can store information when not receiving power.

Memory system 106 is used to store information, such as boot instructions, configuration information (e.g., operational parameters or information related to security and access), or other types of information, that are accessed and used by processor 102. Memory interface 108 encodes and decodes error control codes and generates one or more indicators based thereon. As referred to herein, an error control code may include an error detecting code (EDC), an error correcting code (ECC) (e.g., Hamming code, Reed-Solomon codes or other suitable ECC code), parity bits, or a combination thereof and may be associated with one or more error correction algorithm. Error control codes may use code checking mechanisms, such as a cyclic redundancy check (CRC) checksum, where the CRC checksum is stored along with the actual data, to identify (and sometimes correct) erroneous data content. An exemplary error correcting technique generates an ECC by determining logical combinations of individual bits in the data (e.g., computing an exclusive-OR operation). The error correcting technique performs several exclusive-OR combinations to generate ECC bits (or syndrome) and stores the syndrome with the data. In response to reading the data, the error correcting technique recalculates the syndrome from the data and compares the recalculated syndrome to the stored syndrome retrieved by the read. Any difference indicates an error in the data, the exact syndrome value identifies the bit in the data (or syndrome) that is in error, the error correcting technique corrects the data accordingly. Depending on the number of bits to be detected or corrected, the error correcting technique exclusive-ORs different combinations of the bits.

Memory interface 108 receives memory requests (e.g., a request to read from a physical address or a request to write to a physical address). In response to a write request, memory interface 108 generates an error correcting code corresponding to the data to be written to memory array 110. Memory interface 108 calculates the error control code based on the data to be stored in memory. Memory interface 108 writes the data and the corresponding error control code to the physical address in memory array 110. In response to a read request, memory interface 108 retrieves data stored at the physical address and a corresponding error control code that is stored with the data in memory. Memory interface 108 decodes the error control code and determines whether or not an error has occurred. If the error control code is an error correcting code, memory interface 108 may correct the data in response to detecting an error, prior to providing the data to memory controller 104. In an exemplary application, memory 106 is a flash memory external to an integrated circuit including processor 102 and memory controller 104 is an on-chip flash controller, integrated on the integrated circuit with processor 102.

In exemplary applications, safety requirements (e.g., International Standard IEC 61508 Safety Integrity Levels) require fail-safe electronics systems that prevent or mitigate unsafe consequences in response to detection of a system malfunction. Although error control code implementation of memory system 106 may be sufficient in other applications, the error control provided by the system of FIG. 1 is insufficient for some systems requiring fail-safe electronics (e.g., ISO 26262 Automotive Safety Integrity Level applications). An error control technique provides end-to-end error control for processors (e.g., processor, core, microcontroller, digital signal processor, controller) that interact with memory (e.g., external serial peripheral interface flash, parallel flash, or DRAM memory devices).

Figure 2:
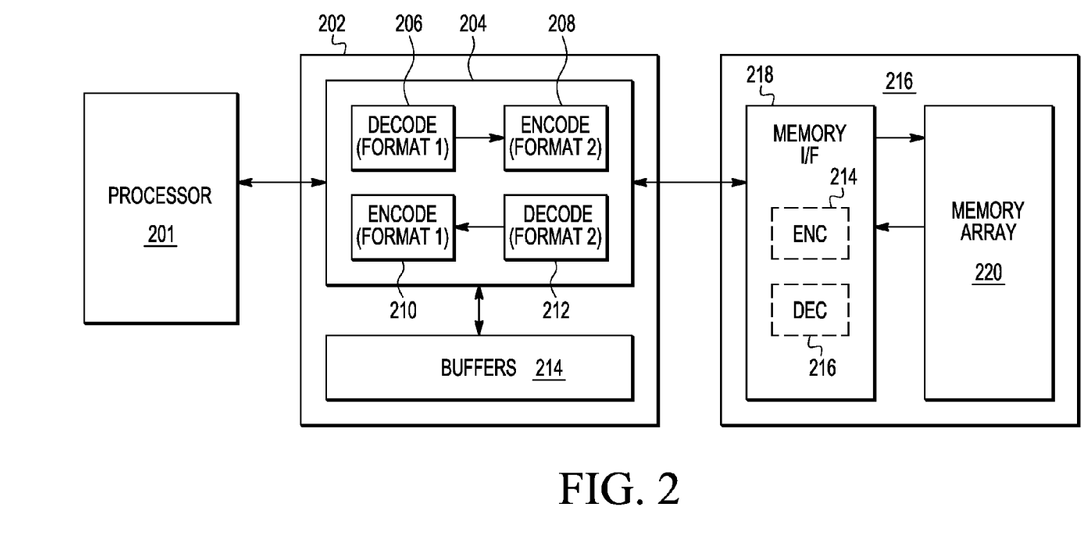
FIG. 2 illustrates a functional block diagram of an electronics system including end-to-end error correction coding consistent with at least one embodiment of the invention.

Referring to FIG. 2, the end-to-end error control technique of embodiments of the present invention includes memory controller 202 which includes translator 204 and associated buffers 214.

In at least one embodiment, memory controller 202 is included on the same integrated circuit as processor 201. Memory controller 202 provides an interface between processor 201 and memory 216. Memory 216 may include an external serial peripheral interface flash memory device. Processor 201 may be a processor, core, host controller, microcontroller, microprocessor, graphics processing unit, digital signal processor, or other suitable processor.

Processor 201 issues memory requests using a first format based on a first data width and first error control code width, and a first logical address based thereon. The first data width and the first logical address are based on a particular architecture of processor 201. Translator 204 translates those memory requests to memory requests having a second format based on a second data width and second error control code width associated with memory 216. Note that the second format may be selectable according to a particular memory implemented in a target application and predetermined using typical integrated circuit techniques (e.g., using board-level pins, jumpers, or fuses, and initialized using Basic Input/Output System, boot code, or other configuration techniques) based on an actual implementation of memory 212 being coupled to processor 201. Translator 204 issues memory commands to memory 216. Those memory commands are consistent with the second format. The data width of processor 201 may be different from a data width of memory array 220. When writing a data width less than the data width of the second format, translator 204 queues, in buffers 214, data associated with writes to consecutive first logical addresses data of the first format. When buffers 214 include data of the second width, then translator 204 determines the error control code based on the data and the second logical address. When memory 212 is a RAM and when writing a data width less than the data width of the second format without additional writes to contiguous addresses of the first format, translator 204 uses a read-modify-write approach to generate the data and an associated error control code for the second logical address. In response to reads of data and error control codes from memory 216 in the second format, translator 204 decodes the data and associated error control code, generates any associated error indicators, formats the retrieved data consistent with the first format (e.g., partitions the data into portions having bit widths consistent with the first format), and encodes an associated error control code based on the formatted data and the first logical address.

Figure 3:
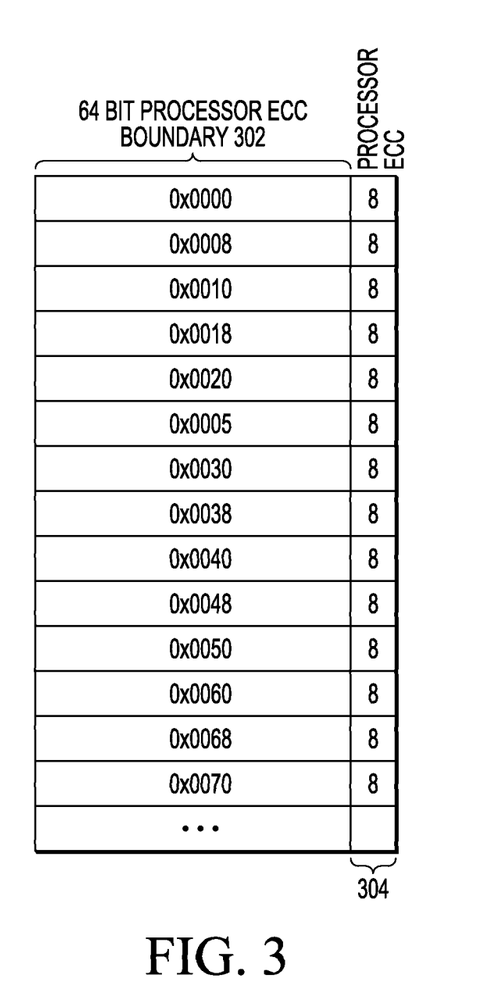
FIG. 3 illustrates an exemplary information format of the memory requestor of FIG. 2, consistent with at least one embodiment of the invention.
Figure 4:
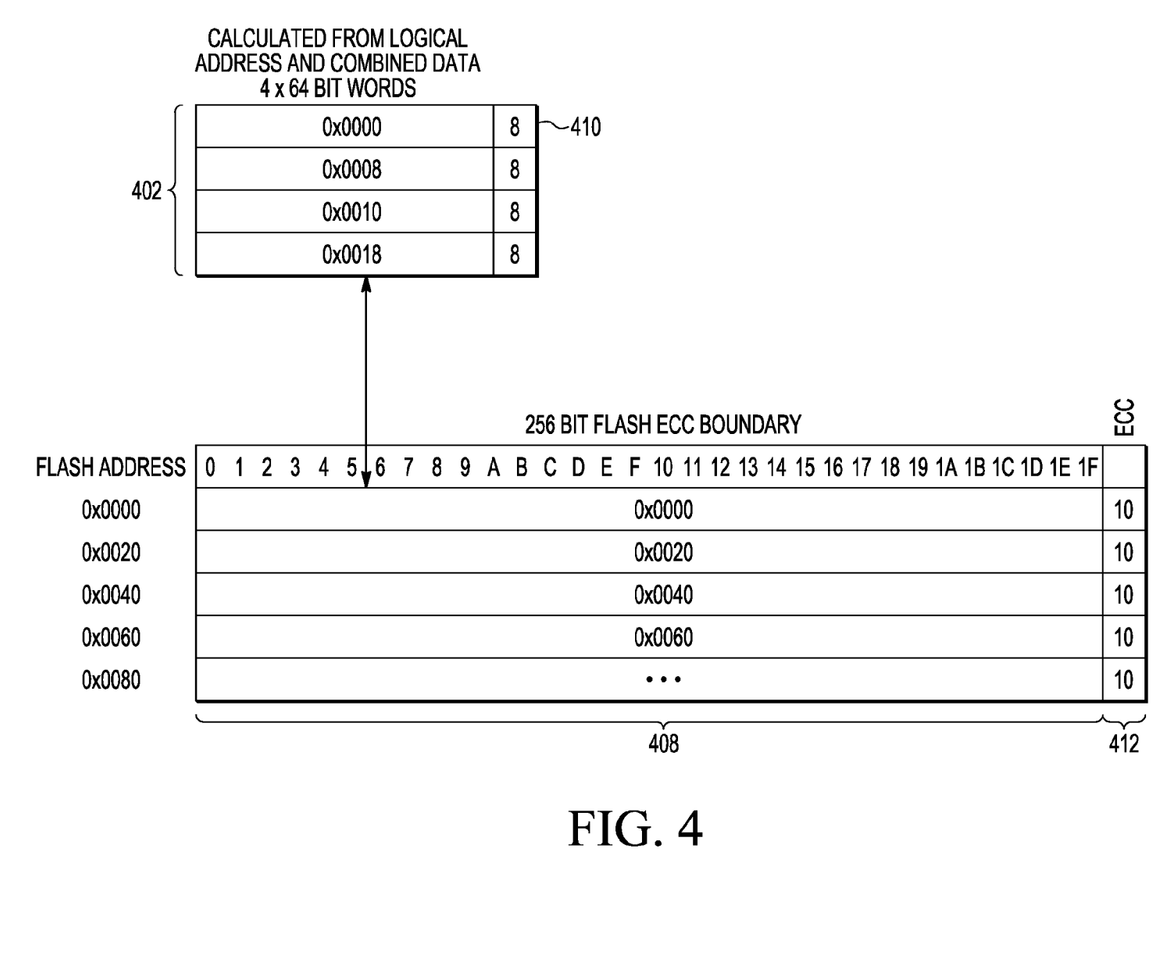
FIG. 4 illustrates an exemplary information format of the memory device of FIG. 2, consistent with at least one embodiment of the invention.

For example, referring to FIGS. 2-4, processor 201 may be a microcontroller unit that generates memory requests having a first logical address corresponding to the first format. Processor 201 addresses data according to a first format having data width 302 and error control code width 304, e.g., 64-bit data width, eight-bit error correcting code width, and addresses on 64-bit data boundaries. In at least one embodiment, processor 201 generates write requests that include an eight bit error correction code, which is redundant information, based on the data combined with the first logical address. For example, processor 201 concatenates the 64-bits of data and the logical address and generates an error correction code consistent with techniques described above and based on the concatenated bits. Processor 201 delivers the data over an internal bus interface to translator 204 (e.g., one or more signal lines coupled to ports of translator 204 for parallel communications). Memory controller 202 includes a bi-directional interface for receiving memory requests from processor 201 and for providing data to processor 201. Translator 204 includes another interface (e.g., one or more ports for synchronous serial communications) for providing memory commands to memory 216 (e.g., a program command to a flash memory) based on the memory request to memory 216 and for receiving results of associated memory accesses from memory 216.

Translator 204 receives the write request and writes the data and error control code to buffers 214. Decoder 206 detects whether any errors occurred in the communication from processor 201 based on the logical address, the data, and associated error control code received from processor 201. For example, decoder 206 regenerates the ECC based on the data and logical address and compares the ECC to an ECC received from processor 201. If decoder 206 detects an error in transmission consistent with techniques described above, decoder 206 provides an indicator thereof to processor 201. Processor 201 or memory controller 202 can then correct the error or otherwise mitigate damage from the error. For example, memory controller 202 may request a resend of the write request or indicate to processor 201 that the write request was faulty. If the error control code is an error correcting code, decoder 206 attempts to reconstruct the original data based on the first error correcting code and the first logical address. Thus, soft errors in the communication of the data or the logical address may be detected and corrected by decoder 206. Note that since processor 201 generates the first error control code based on the first logical address, errors associated with corrupted addressing may be detected in addition to detecting data errors.

In at least one embodiment, memory 216 addresses data according to a second format having data width 408 and error control code width 412, which may be different from the first format used by processor 201. For example, memory 216 has a 256-bit data width, a 10-bit error control code width, and uses physical addresses on 266-bit boundaries. Accordingly, four words of logically addressed data consistent with the first format may be written to memory array 220 at a time. When memory 216 is a volatile memory, translator 204 may use a read-modify-write approach to generate a 256-bit data for a write command from a 64-bit addressable unit of the write request. Alternatively, translator 204 may queue data for multiple write requests in buffers 214 and translator 204 formats multiple 64-bit addressable units into a 256-bit addressable unit of the second format. Translator 204 converts the address of the memory request from the logical address of the first format based on the 64-bit data addressable units of the processor into a corresponding 256-bit data addressable unit of the second format. In addition, encoder 208 generates a 10-bit error control code based on the 256-bit data word combined with a second address (e.g., concatenated with the second logical address or with the physical address). Translator 204 converts the second logical address into a physical address. Memory controller 202 issues the write request to memory 216, which stores the 256-bits of data and the 10-bit error control code in memory array 220 at the physical address. In another example, memory 216 uses a second format that stores 128 bits of data plus 10 error control code bits and addresses those data according to 128-bit data boundaries. Accordingly, two words of logically addressed data consistent with the first format may be written to an addressable unit of memory array 220 consistent with the second format. Note that in other embodiments of processor 201, memory controller 202 and memory 216, the first format and the second format have the same number of data bits and error control code bits and the translation is adjusted accordingly.

In response to a read request from processor 201, translator 204 converts the logical address corresponding to the first format consistent with the processor addressing to a logical address corresponding to the second format corresponding to the memory addressing and further converts the logical address corresponding to the first format corresponding to the memory addressing into a physical address consistent with the second format. In at least one embodiment, translator 204 converts the logical address corresponding to the first format directly to a physical address. Memory controller 202 issues the read request to memory 216, which receives the request at memory interface 218. In at least one embodiment, memory interface 218 includes error control code modules that are disabled. For example, encoder 214 and decoder 216 may be effectively disabled. In other embodiments, memory interface 218 excludes such error correction coding modules. Memory interface 218 accesses memory array 220 using the physical address and provides the retrieved data and associated error control code to translator 204.

Decoder 212 of translator 204 decodes the error correcting code received from memory 216 using the data concatenated with an address (e.g., logical address corresponding to the first format, a logical address corresponding to the second format, or the physical address) and determines whether an error has occurred. If decoder 212 detects an error, decoder 212 generates an indicator thereof, which may be used by processor 201 or translator 202 to correct the error or mitigate damage from the error. If the error control code is an error correcting code, decoder 212 attempts to reconstruct the original data and the physical address based on the error correcting code. Thus, errors in the communication of the address used by the memory or the data received from the memory may be detected and corrected by decoder 212.

Translator 204 translates the physical address into a logical memory address and converts the logical memory address into a logical processor address. In at least one embodiment, translator 204 converts the physical memory address directly to a logical processor address corresponding to the format used by processor 201. Translator 204 parses the data retrieved from memory 216 into data words corresponding to logical addresses of processor 201. For example, translator 204 parses a 256-bit word received from memory 216 into four 64-bit words associated with the read request and generates corresponding logical addresses consistent with a format usable by processor 201. Encoder 210 generates an 8-bit error control code consistent with the first format for each 64-bit word of data and generates a corresponding logical address consistent with the format usable by processor 201. Processor 201 receives each word of data and the corresponding error control code and decodes it accordingly. If processor decode of the error control code detects an error, processor 201 generates an indicator thereof, which may be used by processor 201 to correct the error or mitigate damage from the error. If the error control code is an error correcting code, processor 201 may detect an error when the physical memory address that corresponds to the first logical address was not properly accessed or attempt to reconstruct the original data based on the error correcting code and the logical address. Thus, errors in the communication of the data or address may be detected and corrected by processor 201.

Figure 5:
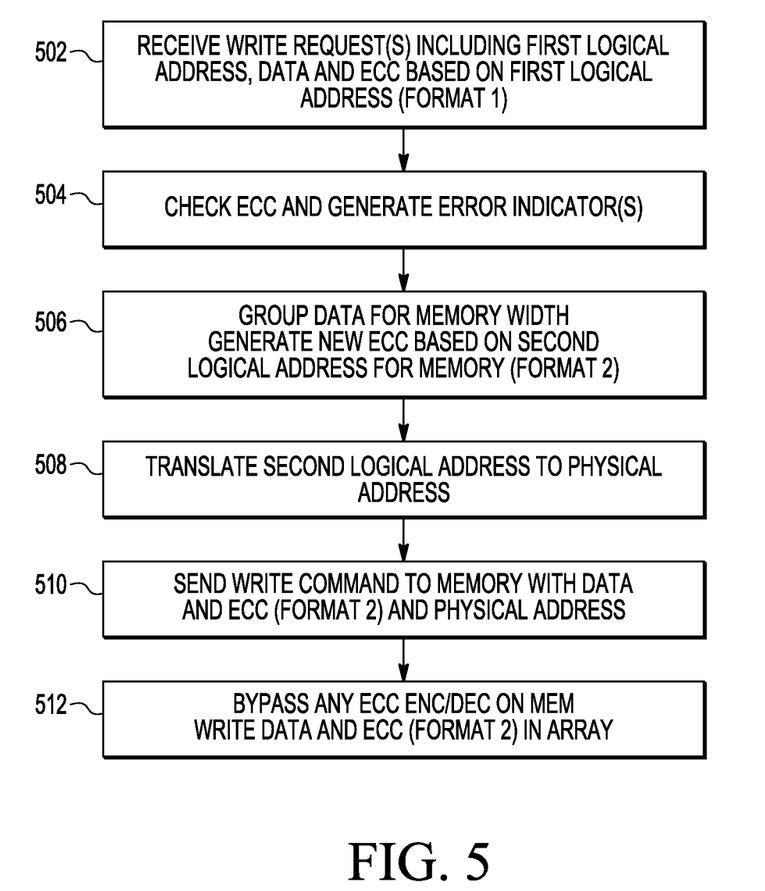
FIG. 5 illustrates exemplary information and control flows for translating a write request received from the memory requestor of FIG. 2, consistent with at least one embodiment of the invention.

Referring to FIGS. 2 and 5, exemplary operations of translator 204 for a write request in an exemplary system implementing the end-to-end error control code technique are described in further detail. Translator 204 receives a write request consistent with a first format consistent with processor 201. The write request includes a first logical address, data, and an error control code based on that first logical address (502). Translator 204 checks the error control code and generates any suitable error indicators based on the error control code (504). Translator 204 buffers and groups data to format the data for the actual memory width and generates a second logical address for the memory. Translator 204 generates the error control code having the second format based on the grouped data and the second logical address for the memory. The error control code has a width based on the error control code width of the memory (506). Translator 204 translates that second logical address to a physical address according to the second format (e.g., the addressing scheme of the actual memory) (508). In at least one embodiment, rather than generate the error control code based on the data concatenated with the second logical address for the memory, translator 204 generates the error control code having the second format based on the physical address for the memory. In at least one embodiment, the memory includes error control modules including encoder 214 and decoder 216. Memory 216 is previously configured to bypass or disable those error control modules and writes the data and the second error control code having the second format in memory array 220 (512).

Figure 6:
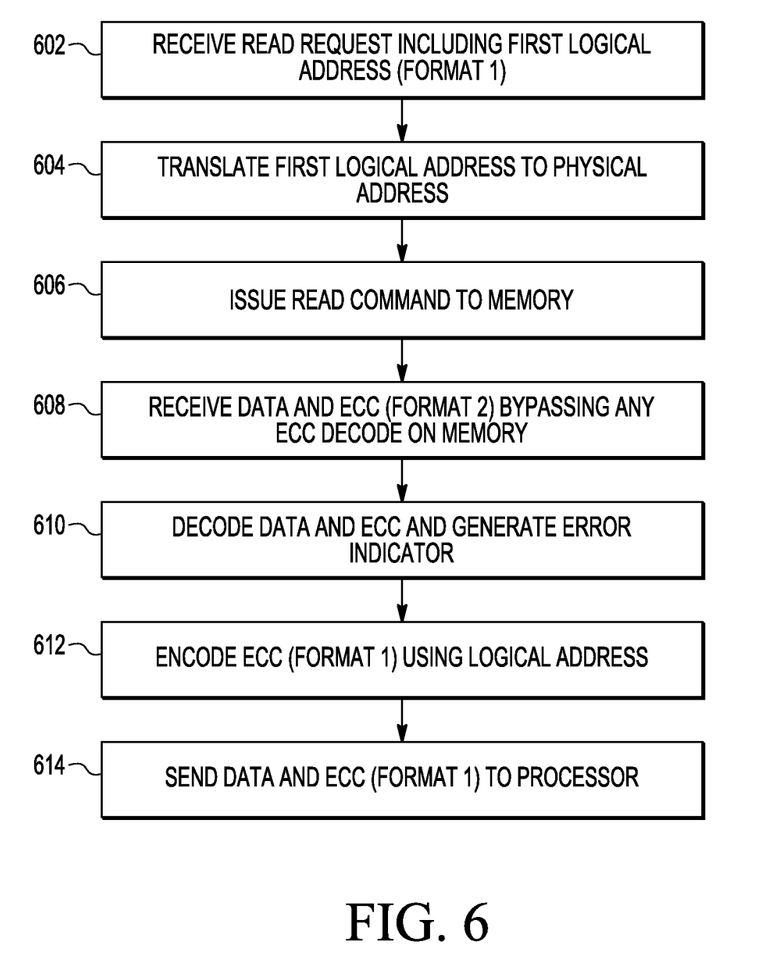
FIG. 6 illustrates exemplary information and control flows for translating a read request received from the memory requestor of FIG. 2, consistent with at least one embodiment of the invention.

Referring to FIGS. 2 and 6, exemplary operations of translator 204 for a read request in an exemplary system implementing the end-to-end error control code technique are described in further detail. Translator 204 receives a read request from processor 201. The read request includes a first logical address consistent with a first format based on data width and error control code width used by processor 201 (602). Translator 204 translates the first logical address to a physical memory address (604). The address translation may be performed using a direct address mapping from first logical address to physical memory address or indirectly, by converting the first logical address to a second logical address consistent with a second format based on a data width and error control code width of the memory and then converting the second logical address to a physical address. Translator 204 issues a read command including the physical address to memory 216 (606). The read bypasses any error control code functionality of the memory and receives data and an error control code having the second format (608). Translator 204 decodes the error control code based on the data received from the memory and the second logical address and generates any suitable error indicators based thereon (610). Translator 204 partitions the received data to isolate data associated with the first logical address of the read request. Translator 204 encodes a corresponding error control code using the first logical address and according to the data width and error control code width of the first format, which is the format of the processor (612). Translator 204 then sends the data and the error control code corresponding to the first logical address to processor 201 (614). Processor 201 generates an error indicator based on the received error control code and data and first logical address.

Thus techniques for providing end-to-end error detection coding between a requesting module and a memory module have been provided. In at least one embodiment of the present invention, a method includes translating a first logical address of a memory request to a physical address. The method includes translating, an error control code and data associated with the memory request, between a first format and a second format. The error control code and data having the first format is generated based on the first logical address. The error control code and data having the second format is generated based on a second address. The method includes generating an error indicator based on the error control code, the data, and one of the first logical address and the second address. The second address may be a second logical address and the second logical address may be generated based on a data width of the memory. The second address may be the physical address. The first format may have a first data width and first error control code width. The second format may have a second data width greater than the first data width and a second error control code width greater than the first error control code width. The memory request may be a read request and translating the error control code and data may include decoding the error control code and data from the second format and generating the error indicator based on the error control code, data, and the second address, the data being received from the memory. The memory request may be a read request and translating the error control code and data may include generating the error control code and data having the first format based on the first logical address. The memory request may be a read request and translating the error control code and data may include providing the error control code and data having the first format to a requestor of the memory request. The translating the error control code and data may include detecting an error based on a corrupted physical address. The memory request may be a write request and translating the error control code and data may include decoding the error control code and data from the first format and generating the error indicator based on the error control code, data, and the first logical address, the data being received from a requestor of the memory request. The memory request may be a write request and translating the error control code and data may include formatting the data and generating the second error control code based on formatted data and the second address to generate the error control code and data having the second format. The method may include issuing a memory command including the physical address and the error control code and data having the second format, the memory command being based on the memory request. The method may include bypassing an error control code operation of the memory.

In at least one embodiment of the disclosure, an apparatus includes a memory controller. The memory controller includes an address translator configured to translate a first logical address associated with a memory request to a physical address. The memory controller includes an error control code and data translator configured to translate an error control code and data associated with the memory request between a first format and a second format. The error control code and data having the first format is generated based on the first logical address and the error control code and data having the second format is generated based on a second address. The error control code and data translator is configured to generate an error indicator based on the error control code, the data, and one of the first logical address and the second address. The second address may be a second logical address. The second logical address may be generated based on a data width of the memory. The second address may be the physical address. The first format may have a first data width and first error control code width. The second format may have a second data width greater than the first data width and a second error control code width greater than the first error control code width. The translator may include a first decoder responsive to the memory request being a read request. The first decoder may be configured to generate the error indicator based on the second address and the error control code and data having the second format, the data being received from the memory system. The translator may include a first encoder responsive to the memory request being the read request. The first encoder may be configured to generate the error control code having the first format and based on the first logical address.

The translator may include a second decoder responsive to the memory request being a write request. The second decoder may be configured to generate the error indicator based on the first logical address and the error control code and data having the first format, the data being received from a requestor of the memory request. The translator may include a second encoder responsive to the memory request being the write request. The second encoder may be configured to generate the error control code having the second format and based on the second address. The error indicator may indicate an error based on a corrupted physical address. The apparatus may include a controller configured to generate the memory request. The apparatus may include an interface to issue a memory command to a memory module using the physical address, the memory command being based on the memory request. The apparatus may include a memory module comprising a memory module interface and a storage array. The memory module interface may be configured to store data and corresponding error control codes in the storage array according to the physical address. The memory module may include an error control code memory module including an error control code bypass mode. The memory module may be a memory module without error control code capability.

In at least one embodiment of the disclosure, an apparatus includes a requesting module configured to generate a memory request. The apparatus includes a means for providing end-to-end error detection coding between the requesting module and a memory module. The providing includes translating a logical address associated with the memory command to a physical address. The providing includes translating an error control code and data associated with the memory request between a first format and a second format. The error control code having the first format is generated based on the logical address and the error control code having the second format is generated based on the second address. The providing includes generating an error indicator based on the error control code, the data, and one of the logical address and the second address.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test, or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

Although the invention is described herein with reference to specific embodiments, various modifications and changes can be made without departing from the scope of the present invention as set forth in the claims below. For example, while the invention has been described in an embodiment in which memory 216 is a serial peripheral interface flash memory device, one of skill in the art will appreciate that the teachings herein can be utilized with other types of memory and other memory interfaces. In addition, while the invention has been described in an embodiment in which memory requests are made to a storage device, one of skill in the art will appreciate that the teachings herein can be utilized with other types of requests that are communicated to other types of devices (e.g., coprocessors). Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
   translating a first logical address of a memory request to a physical address;
   translating an error control code and data associated with the memory request between a first format and a second format and generating an error indicator based thereon, wherein the error control code and data having the first format is generated based on the first logical address and the error control code and data having the second format is generated based on a second address; and
   generating an error indicator based on the error control code, the data, and one of the first logical address and the second address, wherein
   the second address is a second logical address, and
   the second logical address is generated based on a data width of the memory.

2. The method, as recited in claim 1, wherein the memory request is a read request and translating the error control code and data comprises:
   decoding the error control code and data from the second format and generating the error indicator based on the error control code, data, and the second address, the data being received from the memory;
   generating the error control code and data having the first format based on the first logical address; and
   providing the error control code and data having the first format to a requestor of the memory request.

3. The method, as recited in claim 2, wherein the translating the error control code and data comprises:
   detecting an error based on a corrupted physical address.

4. The method, as recited in claim 1, wherein the memory request is a write request and translating the error control code and data comprises:
   decoding the error control code and data from the first format and generating the error indicator based on the error control code, data, and the first logical address, the data being received from a requestor of the memory request;
   formatting the data and generating the second error control code based on formatted data and the second address to generate the error control code and data having the second format.

5. The method, as recited in claim 4, further comprising:
   issuing a memory command including the physical address and the error control code and data having the second format, the memory command being based on the memory request; and
   bypassing an error control code operation of the memory.

6. A method comprising:
   translating a first logical address of a memory request to a physical address;
   translating an error control code and data associated with the memory request between a first format and a second format and generating an error indicator based thereon, wherein the error control code and data having the first format is generated based on the first logical address and the error control code and data having the second format is generated based on a second address; and
   generating an error indicator based on the error control code, the data, and one of the first logical address and the second address, wherein the first format has a first data width and first error control code width and the second format has a second data width greater than the first data width and a second error control code width greater than the first error control code width.

7. An apparatus comprising:
   a memory controller comprising:
   an address translator configured to translate a first logical address associated with a memory request to a physical address; and
   an error control code and data translator configured to translate an error control code and data associated with the memory request between a first format and a second format, wherein
   the error control code and data having the first format is generated based on the first logical address and the error control code and data having the second format is generated based on a second address,
   the error control code and data translator being configured to generate an error indicator based on the error control code, the data, and one of the first logical address and the second address,
   the second address is a second logical address, and the second logical address is generated based on a data width of the memory.

8. The apparatus, as recited in claim 7, wherein the translator comprises:
a first decoder responsive to the memory request being a read request, first decoder being configured to generate the error indicator based on the second address and the error control code and data having the second format, the data being received from the memory system; and
a first encoder responsive to the memory request being the read request, the first encoder being configured to generate the error control code having the first format and based on the first logical address.

9. The apparatus, as recited in claim 8, wherein the translator further comprises:
a second decoder responsive to the memory request being a write request, the second decoder being configured to generate the error indicator based on the first logical address and the error control code and data having the first format, the data being received from a requestor of the memory request; and
a second encoder responsive to the memory request being the write request, the second encoder being configured to generate the error control code having the second format and based on the second address.

10. The apparatus, as recited in claim 8, wherein the error indicator indicates an error based on a corrupted physical address.

11. The apparatus, as recited in claim 7, further comprising:
a controller configured to generate the memory request.

12. The apparatus, as recited in claim 7, further comprising:
an interface to issue a memory command to a memory module using the physical address, the memory command being based on the memory request; and
the memory module comprising a memory module interface and a storage array, the memory module interface being configured to store data and corresponding error control codes in the storage array according to the physical address.

13. The apparatus, as recited in claim 12, wherein the memory module comprises an error control code memory module including an error control code bypass mode.

14. The apparatus, as recited in claim 12, wherein the memory module is a memory module without error control code capability.

15. An apparatus comprising: a memory controller comprising:
an address translator configured to translate a first logical address associated with a memory request to a physical address; and
an error control code and data translator configured to translate an error control code and data associated with the memory request between a first format and a second format, wherein
the error control code and data having the first format is generated based on the first logical address and the error control code and data having the second format is generated based on a second address,
the error control code and data translator being configured to generate an error indicator based on the error control code, the data, and one of the first logical address and the second address,
the first format has a first data width and first error control code width and the second format has a second data width greater than the first data width and a second error control code width greater than the first error control code width.

* * * * *